United States Patent [19]

Kharitonov et al.

[11] 4,090,393
[45] May 23, 1978

[54] METHOD FOR THE CALIBRATION OR CHECKING OF DYNAMOMETERS AND APPARATUS EMBODYING SAME

[76] Inventors: Ivan Ivanovich Kharitonov, Khlebozavodskoi proezd, 8, korpus 2, kv. 149; Artemy Stepanovich Bolshikh, Khlebozavodskoi proezd, 8, korpus 1, kv. 63, both of Moscow, U.S.S.R.

[21] Appl. No.: 751,528

[22] Filed: Dec. 16, 1976

[51] Int. Cl.² .............................................. G01L 25/00
[52] U.S. Cl. ....................................................... 73/1 B
[58] Field of Search .......................................... 73/1 B

[56] References Cited
U.S. PATENT DOCUMENTS 3,194,050  7/1965  Ruge ..................................... 73/1 B

*Primary Examiner*—S. Clement Swisher
*Attorney, Agent, or Firm*—Lackenbach, Lilling & Siegel

[57] ABSTRACT

The method for the calibration or checking of dynamometers consists of applying a force to the dynamometer being subjected to calibration or checking through a master dynamometer. The force applied is progressively changed in magnitude, and after each such application the force applied to the dynamometer being subjected to calibration or checking is retained, simultaneously relieving the master dynamometer of the force. In said method, a force may also be applied directly to the dynamometer being subjected to calibration or checking by means of standard weights.

The apparatus for the calibration or checking of dynamometers incorporates two frames one of which is rigidly attached and the other is movable relative to the first one. Interposed between the frames is the dynamometer being subjected to calibration or checking and interacting therewith is a means of applying a force which applies a calibrated force through a master dynamometer. The apparatus incorporates another means of applying a force only to the dynamometer being subjected to calibration or checking which assures that the master dynamometer is relieved of the force applied.

The method and apparatus offer the prospect of checking and calibrating dynamometers against forces in excess of 10,000 kN with practically no upper limit and an error never higher than between 0.25 and 0.5%.

3 Claims, 3 Drawing Figures

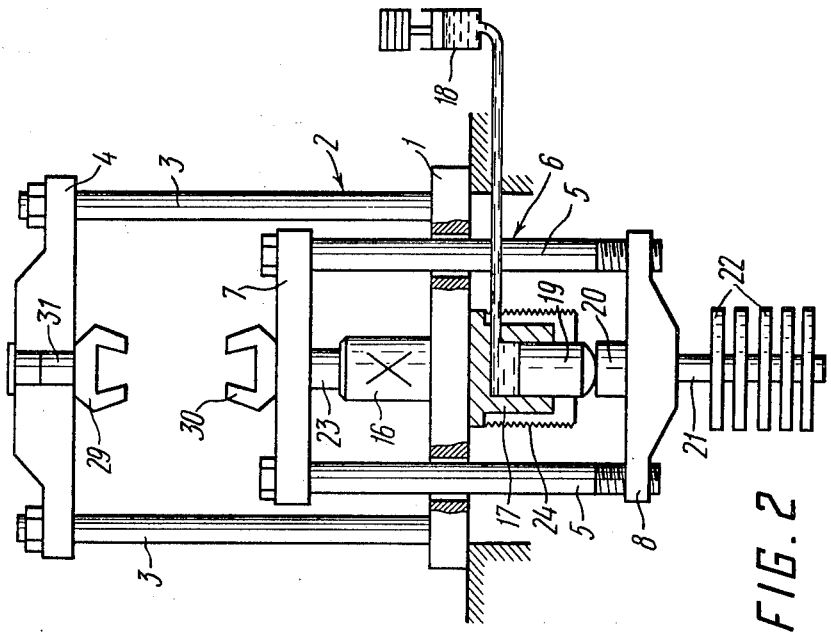
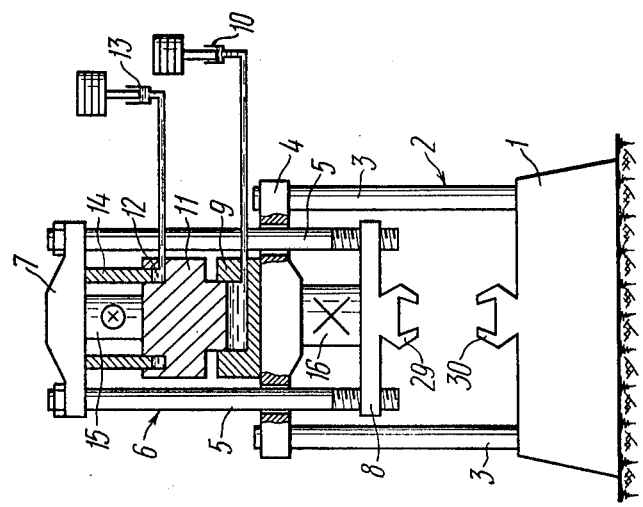
FIG. 2
FIG. 1

METHOD FOR THE CALIBRATION OR CHECKING OF DYNAMOMETERS AND APPARATUS EMBODYING SAME

The present invention relates to force-measuring apparatus and more specifically to a method for the calibration or checking of dynamometers and an apparatus embodying same which find their application in the fields of standardization and metrology, in engineering and metallurgy and, in scientific and research institutions for the calibration or checking of dynamometers.

Modern technology had advanced to a point whereas the methods and apparatus used in the testing of new materials and complete structures must meet much more stringent requirements than ever before. This and the fact that the test loads are also constantly increasing poses the problem of enhancing the accuracy of both the testing machinery and the devices used for checking.

At present, available in the world's practice of testing are machines capable of applying ultimate forces between 30,000 and 50,000 kN. The same forces are employed in calibrating and checking measuring cells for rolling mills. The tolerable relative error of such testing machines must be less than 1% of the force measured. An increase in the relative error of said machines either leads to an excessive size and weight of the structures engineered or impairs their reliability and shortens the service life, all these drawbacks resulting in the end from the imperfectness of the methods and apparatus for calibrating and checking.

Since the standard weights used for the checking of master means of measuring forces in the most accurate way are available in limited sets, the accuracy attainable in providing high forces and, consequently, in calibrating or checking load cells is determined from calculations. This reduces the trustworthiness of calibration and checking to a considerable extent.

Widely known is a method for the calibration and checking of dynamometers wherein a force is applied to the dynamometer being subjected to calibration and checking through a master dynamometer or directly by means of a master weight, said force being progressively changed in magnitude.

In said method, standard weights are placed on the dynamometer subjected to calibration or checking and the calibration or checking is done against the value thereof or use is made of three master dynamometers the sum of the ultimate forces whereof determining the ultimate force of the dynamometer subjected to calibration or checking. In this latter case, the dynamometer which has been calibrated or checked against the total force of the three master dynamometers is eventually used as a master dynamometer for the calibration or checking of dynamometers capable of measuring higher forces.

The method described provides for the calibration or checking within a limited range due to the fact that the force-measuring apparatus used now for the purpose of calibrating or checking dynamometers employ standard weights which are available in limited sets and are costly. If three master dynamometers are used, the progressive increases in the force applied to the dynamometer being subjected to calibration or checking introduces an accumulated error into the value of the force applied and, consequently, into the readings of the dynamometer being subjected to calibration or checking.

In addition, said method calls for placing the master dynamometers with a high degree of accuracy which is time-consuming.

The drawbacks of calibrating or checking by means of standard weights are obvious. When three master dynamometers are being used, the accumulated error introduced in the course of calibration or checking by changing the force applied over the range determined by the sum of the ultimate forces the three master dynamometers are capable of withstanding is unavoidable because these master dynamometers have been calibrated or checked by means of standard weights.

Also widely known is an apparatus for the calibration or checking of dynamometers comprising a bedplate and two frames, one of which is rigidly attached to the bedplate and the other is movable relative to the first one, interposed wherebetween is the dynamometer being subjected to calibration or checking so that interacting therewith is a standard weight applying a force directly to this dynamometer or a means of applying a force which applies a calibrated force to the dynamometer being subjected to calibration or checking through a master dynamometer.

When the force is applied in said apparatus by standard weights, the weights are suspended from the moving frame so as to apply a force directly to the dynamometer being subjected to calibration or checking. When a calibrated force is applied through the master dynamometer, employed in the apparatus, as pointed out hereinabove, the three master dynamometers are disposed at the angles of an equilateral triangle. Such a pattern of master dynamometer disposition calls for an accuracy of a high order and the very process of calibrating and checking is a time-consuming one, for the master dynamometers rated for one total force must be replaced by those rated for another total force.

It is the object of the present invention to provide a method for the calibration or checking of dynamometers and an apparatus embodying same which assure the calibration and checking or dynamometers over practically an unlimited range of forces and preserve the accuracy attained in producing each force.

This object is attained by a method for the calibration or checking of dynamometers consisting of applying a force to the dynamometer being subjected to calibration or checking through a master dynamometer or directly by a standard weight, this force being progressively changed in magnitude, according to the invention, after each such application of a force the force applied to the dynamometer being subjected to calibration or checking is retained and simultaneously the master dynamometer is relieved of said force or the force applied by the standard weight is removed.

Said object is also attained by an apparatus for the calibration or checking of dynamometers comprising a bedplate and two frames, one of which is rigidly attached to the bedplate and the other is movable relative to the first one, interposed wherebetween is the dynamometer being subjected to calibration or checking so that interacting therewith is either a standard weight applying a force thereto directly or a means of applying a force which applies a calibrated force to the dynamometer being subjected to calibration or checking through a master dynamometer that is provided. In accordance with the invention, an additional means for applying a force only to the dynamometer being subjected to calibration or checking is included, said means also assuring that the master dynamometer is relieved of the force applied or that the force applied by the standard weight to the dynamometer being subjected to calibration or checking is removed.

It is expedient that, if the main means of applying a force is provided in the form of a hydraulic cylinder, in the bore of whfich a piston communicating with a source of hydrostatic pressure moves, the additional means of applying a force is provided in the form of a hollow cylinder disposed in the bore whereof is a master dynamometer and in the end face of the piston of the hydraulic cylinder facing the hollow cylinder there is provided an annular recess which communicates with a source of hydrostatic pressure and wherein said hollow cylinder can move.

It is also expedient, if the moving frame is installed with provision for vertical displacement and linked up therewith is the standard weight, to provide the additional means of applying a force in the form of a hydraulic cylinder communicating with a source of hydrostatic pressure and to provide two indicators serving to monitor that the force applied to the dynamometer being subjected to calibration or checking is a constant one, said indicators being accommodated on the moving frame so that one of them interacts with the piston of the hydraulic cylinder and the other with the dynamometer being subjected to calibration or checking.

The disclosed method for the calibration or checking of dynamometers and the apparatus embodying same enable the calibration and checking of dynamometers against forces which are practically unlimited and with a relative error never exceeding about 0.25 to 0.5%.

Said apparatus is compact and light, can be made and installed without any difficulty and its components need not be fabricated to close tolerances.

The present invention will be best understood from the following description of its preferred embodiments when this description is read in conjunction with the accompanying drawings in which:

FIG. 1 is a side view partly in section of the disclosed apparatus for the calibration or checking of dynamometers according to the invention employed wherein is a master dynamometer;

FIG. 2 is a side view partly in section of the disclosed apparatus for the calibration or checking of dynamometers according to the invention employed wherein is a set of standard weights.

Figure 3:
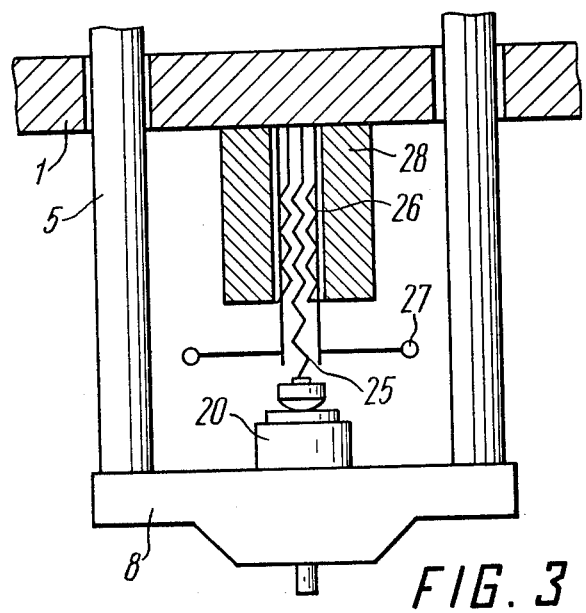
FIG. 3 is a side view partly in section of the means of applying a force, in another embodiment, used in the disclosed apparatus in accordance with invention employed wherein is a set of standard weights.

Referring to FIG. 1, the disclosed apparatus for the calibration or checking of dynamometers described hereinafter, using the well-known twin-zone tensile-and-compression testing machine as the example, incorporates a bedplate 1 installed on a foundation and to which there is rigidly attached a frame 2 consisting of vertical columns 3 and a cross beam 4. Passing with a clearance through holes in the cross beam 4 are columns 5 of a second frame 6, said columns 5 being connected by an upper cross beam 7 and a lower cross beam 8.

Incorporated into the apparatus is a means of applying a force which is fitted to the upper cross beam 4 of the frame 2 and is provided, in the embodiment described, in the form of a hydraulic cylinder 9, the bore of which is hydraulically linked with a source 10 of hydrostatic pressure. An annular recess 12 in the piston 11 of the hydraulic cylinder 9 is hydraulically linked with a self-contained source 13 of hydrostatic pressure.

Fitted into said annular recess is a hollow cylinder 14 on the upper end face of which the upper cross beam 7 of the frame 6 is accommodated. Disposed in the bore of the cylinder 14 and on the end face of the piston II is a master dynamometer 15, i.e. one which has been checked in advance. The hollow cylinder 14 is also a means of applying a force and serves to relieve the master dynamometer 15 of the force applied. The dynamometer 16 being subjected to calibration or checking is placed on the lower cross beam 8 of the frame 6.

In the described embodiment of the apparatus and in other embodiments thereof as well as in the description of the method, used as the dynamometer being subjected to calibration or checking is a dynamometer 16 subjected to checking which can be replaced by a dynamometer subjected to calibration without any changes in the layout of the apparatus or in the method for the calibration or checking of dynamometers.

A calibrated force is applied to the dynamometer 16 being subjected to checking by the hydraulic cylinder 9 through the master dynamometer 15.

The described embodiment of the apparatus enables the calibration and checking of dynamometers against high loads of the order of between 10,000 and 100,000 kN with an error not exceeding the error of the master dynamometer 15.

Another embodiment of the disclosed apparatus for the calibration or checking of dynamometers is adapted to calibrate or check master dynamometers proper. Referring to FIG. 2, it will be noted that this embodiment of the apparatus is basically identical with the embodiment described above. The difference is that the columns 5 of the frame 6 pass, though also with a clearance, through the holes of the bedplate 1 and a means for applying a force provided in the form of a hydraulic cylinder 17 hydraulically linked with a source 18 of hydrostatic pressure is attached to the lower side of the bedplate 1. Interposed between a piston 19 of the hydraulic cylinder 17 and the lower cross beam 8 of the frame 6 is an indicator 20 serving to monitor that the force applied to the dynamometer 16 subjected to checking is a constant one. Suspended from the lower cross beam 8 of the frame 6 by means of a rod 21 is a set of standard weights 22 applying a force directly to the dynamometer 16. In the course of calibration or checking, said force applied by the weights 22 is replaced by a force applied by the hydraulic cylinder 17.

The dynamometer 16 being subjected to checking is placed on the bedplate 1 just under the upper cross beam 7 of the frame 6. Interposed between said dynamometer 16 and the upper cross beam 7 of the frame 6 is a second indicator 23 also serving to monitor that the force applied to the dynamometer 16 being subjected to checking is a constant one. Used as the indicators 20 and 23 can be, for example, well-known strain gauges.

A spring 24 slipped on the body of the hydraulic cylinder 17 and connected to the piston 19 is intended to return the piston 19 to its initial position when inoperative.

In another embodiment, a means for applying a force is provided in the form of a jack comprising a screw 25 (FIG. 3) and a threaded sleeve 26 rotatable by a handwheel 27. The sleeve 26 is fitted into a housing 28 rigidly attached to the bedplate 1.

Said jack can be provided with an electric drive in which case the handwheel 27 is replaced by a gear in mesh with a pinion fitted to the shaft of an electric motor (not shown).

The apparatus in the embodiments described above serve the purpose of calibrating or checking compression dynamometers. For the calibration or checking of tension dynamometers, the apparatus is provided with an upper grip 29, a lower grip 30 and an indicator 31 like indicators 20 and 23 (FIG. 2).

The procedure of checking dynamometers by means of the apparatus for the calibration or checking same is as follows.

A calibrated force is applied to the dynamometer 16 being subjected to checking (FIG. 1). To that end, an excessive pressure is built up in the hydraulic cylinder 9, using the source 10 of hydrostatic pressure, which causes the piston 11 to act on the dynamometer 16 being subjected to checking through the master dynamometer 15 and the frame 2. Since the columns 5 and the cross beams 7 and 8 form the rigid frame 6 and no pressure is applied to the annular recess 12, the force applied to the dynamometer 16 subjected to checking is the same as that applied to the master dynamometer 15. The dynamometer 16 is checked against the readings of the master dynamometer 15 over the range determined by its scale (the range of ultimate forces). If the dynamometer 16 subjected to checking is rated for a force exceeding the ultimate force for which the master dynamometer 15 has been calibrated, then the force applied to the dynamometer 16 being subjected to checking is retained and simultaneously the master dynamometer is relieved of this force. To achieve that, an excessive pressure is built up in the annular recess 12 by means of the source 13 of hydrostatic pressure when the ultimate force for which the master dynamometer is rated or any other specified force within the range of its scale has been reached. Acted upon by the pressure of oil, the hollow cylinder 14 moves upwards, relieving the master dynamometer 15 of the force applied while the force applied to the dynamometer 16 being subjected to checking remains unchanged and the accuracy attained in applying this force is determined by the accuracy of the master dynamometer 15.

Thus, the calibrated force applied to the dynamometer 16 being subjected to checking is retained by virtue of replacing the force applied through the master dynamometer 15 by the force directly applied to the dynamometer 16 subjected to checking by the hollow cylinder 14.

As soon as the master dynamometer reads zero or any other specified value within the limits of its scale, no excessive pressure is applied to the annular recess 12 any longer but excessive pressure is again built up in the hydraulic cylinder 9, using the source 10 of hydrostatic pressure. At this stage, the force applied to the dynamometer 16 being subjected to checking is equal to the force applied before plus the reading of the master dynamometer 15 at the given instant. This assures the checking of the dynamometer 16 at the next point against a force exceeding the ultimate force for which the dynamometer 15 is rated.

On reaching the maximum value (or any other specified value) on the scale of the master dynamometer 15, the source 13 of hydrostatic pressure is again set into operation, building up excessive pressure in the annular recess 12 so as to relieve the master dynamometer of the force applied thereto.

The cycle is repeated until the ultimate force the dynamometer 16 being subjected to checking is rated for is reached, and in the course of checking each time the reading of the master dynamometer 15 is added to the force applied before. Since the application of each force to the dynamometer 16 being subjected to checking is done according to the readings of the master dynamometer 15, the relative error of the force applied will never exceed the error of the master dynamometer 15.

It is known that for the calibration or checking of master dynamometers use is made of standard weights. Yet, when forces as high as 10,000 kN are involved in the calibration or checking of dynamometers, the use of standard weights is economically unsound and technically difficult, because the cost of manufacturing a standard weight is high and the apparatus for calibrating or checking as well as the contrivances for the application or removal of standard weights are difficult to make.

The apparatus illustrated in FIG. 2 provides for the checking of the dynamometer 16 against a force of 10,000 kN and upwards by using a standard weight producing a force, for example, of only 1000 kN. To carry out the check-up, the force produced by a standard weight 22 is applied directly to the dynamometer 16 being subjected to checking by applying to, or removing from, a rod 21 the standard weights 22 in succession against which the dynamometer 16 is being checked. On applying the entire set of the standard weights, the reading of the indicator 23 is noted, and then the standard weights 22 are removed (or applied) in succession. On removing each of the standard weights 22, the force produced by each of the weights is replaced with the aid of the hydraulic cylinder 17 and the source 18 of hydrostatic pressure. To assure that the force applied to the dynamometer 16 being subjected to checking is a constant one, the replacing force applied by the hydraulic cylinder is monitored by means of the indicator 23 so that each time its reading is the same as the reading obtained with all the standard weights 22 applied.

On replacing the force applied by all standard weights 22 or part thereof, said standard weights are applied in succession to the rod 21 once more and the checking of the dynamometer 16 is repeated. Here, the stability of the force previously applied to the dynamometer 16 is monitored by means of the indicator 20, its reading being kept constant with the aid of the hydraulic cylinder 17 after each application of the next standard weight 22 to the rod 21. The cycle is repeated until applied is the force for which the dynamometer 16 subjected to checking is rated, and each time the force produced by each successive standard weight 22 is added to the force applied before.

When the screw 25 operating in conjunction with the threaded sleeve 26 (FIG. 3) is used instead of the hydraulic cylinder 17 in the second embodiment of the method, the procedure of replacing the force applied to the dynamometer 16 subjected to checking remains the same as described hereinabove.

The method for the calibration of dynamometers when the dynamometer 16 being subjected to checking is replaced by a dynamometer which is to be calibrated remains the same, both in the thechnique and the sequence of events, as described hereinabove.

The disclosed method for the calibration or checking of dynamometers and the apparatus embodying same enable the calibration or checking of dynamometers against forces in excess of 10,000 kN with an error never higher than between 0.25 and 0.5%. The method and apparatus make use of standard weights and master poises available in limited sets and of a master dynamometer rated for a force which is by far smaller than the force rated for the dynamometer subjected to calibration or checking.

The disclosed method and apparatus provide for the calibration or checking of dynamometers against forces which are practically unlimited.

In addition, the accumulated relative error of the force applied in a progressively increasing way through a master dynamometer or by standard weights, the error whereof is constant, is reduced and consequently is reduced the error liable to which are the results of the calibration or checking of dynamometers.

What is claimed is:

1. A method for the calibration or checking of dynamometers comprising the following operations: applying a force to the dynamometer being subjected to calibration or checking through a master dynamometer, said force being progressively changed in magnitude; retaining the force applied to said dynamometer being subjected to calibration or checking after each said application of a force; and simultaneously relieving said master dynamometer of said force applied.

2. An apparatus for the calibration or checking of dynamometers comprising a bedplate, a first frame rigidly attached to said bedplate, a second frame installed on said first frame with provision for free displacement, a master dynamometer interposed between said frames, a dynamometer being subjected to calibration or checking being interposed between said frames, a first means for applying a force interacting with said dynamometer being subjected to calibration or checking and applying a calibrated force to this dynamometer through said master dynamometer, a second means for applying a force only to said dynamometer being subjected to calibration or checking and assuring that said master dynamometer is relieved of the force applied.

3. An apparatus for the calibration or checking of dynamometers comprising: a bedplate; a first frame rigidly attached to said bedplate; a second frame installed on said first frame with provision for free displacement, a master dynamometer interposed between said frames, the dynamometer being subjected to calibration or checking being interposed between said frames; a first means for applying a force interacting with said dynamometer being subjected to calibration or checking and applying a calibrated force to this dynamometer through said master dynamometer, a hydraulic cylinder serving as said first means, and a first source of hydrostatic pressure communicating with said hydraulic cylinder; and a second means for applying a force only to said dynamometer being subjected to calibration or checking and assuring that said master dynamometer is relieved of the force applied, a hollow cylinder serving as said second means, said master dynamometer being disposed inside said hollow cylinder, the end face facing said hollow cylinder of a piston of said hydraulic cylinder being provided with an annular recess in which said hollow cylinder can move, and a second source of hydrostatic pressure communicating with said annular recess.

* * * * *